US009023161B2

(12) United States Patent
Ma et al.

(10) Patent No.: US 9,023,161 B2
(45) Date of Patent: May 5, 2015

(54) METHOD FOR FINISHING SEAMLESS SPORTSWEAR AND OUTDOOR CLOTHING

(71) Applicant: Korea Institute of Industrial Technology, Cheonan-si, Chungcheongnam-do (KR)

(72) Inventors: Dae Chun Ma, Seoul (KR); Hee Cheol Cha, Yongin-si (KR); Jun Ho Park, Ansan-si (KR); Jee Young Lim, Jeonju-si (KR)

(73) Assignee: Korea Institute of Industrial Technology, Cheonan-Si (KR)

( * ) Notice: Subject to any disclaimer, the term of this patent is extended or adjusted under 35 U.S.C. 154(b) by 0 days.

(21) Appl. No.: 14/123,494

(22) PCT Filed: Nov. 8, 2012

(86) PCT No.: PCT/KR2012/009406
§ 371 (c)(1),
(2) Date: Dec. 2, 2013

(87) PCT Pub. No.: WO2013/069988
PCT Pub. Date: May 16, 2013

(65) Prior Publication Data
US 2014/0190614 A1    Jul. 10, 2014

(30) Foreign Application Priority Data

Nov. 9, 2011   (KR) .......................... 10-2011-0116426

(51) Int. Cl.
*B32B 37/00*   (2006.01)
*A41H 43/04*   (2006.01)
(Continued)

(52) U.S. Cl.
CPC ................ *A41H 43/04* (2013.01); *B29C 65/08* (2013.01); *B29C 65/50* (2013.01)

(58) Field of Classification Search
USPC .......... 156/73.1, 73.4, 157, 502, 580.1, 580.2
See application file for complete search history.

(56) References Cited

U.S. PATENT DOCUMENTS 5,885,679 A * 3/1999 Yasue et al. ..................... 428/57
7,005,021 B2 * 2/2006 Kramer ......................... 156/73.4
(Continued)

FOREIGN PATENT DOCUMENTS

JP    2005-226173 A    8/2005
JP    2007-084627 A    4/2007
(Continued)

OTHER PUBLICATIONS

International Search Report for PCT/KR2012/009406, 3 pages (Feb. 22, 2013).

*Primary Examiner* — James Sells
(74) *Attorney, Agent, or Firm* — Choate, Hall & Stewart, LLP (57) ABSTRACT

Provided is a finishing treatment method of seamless sportswear and outdoor clothing, including: welding two or more moisture-permeable waterproof fabrics with an ultrasonic welder in a state of overlapping end parts thereof each other; and finishing the end parts of the moisture-permeable waterproof fabrics with a seal sealing tape, whereby in the seamless sportswear and outdoor clothing which are finishing treated according to the embodiments of the present invention, since a sewing part such as over lock and the like is removed, a friction or compression phenomenon can be prevented from being generated from a part to which a pressure is applied, a sewing wrinkle generation phenomenon generated upon sewing and a coating face slip phenomenon of the moisture-permeable waterproof fabric due to a sewing needle can be solved, and excellent tensile strength and waterproof performance can be realized.

10 Claims, 4 Drawing Sheets

(51) Int. Cl.
   *B29C 65/08*   (2006.01)
   *B29C 65/50*   (2006.01)

(56) References Cited

U.S. PATENT DOCUMENTS 8,435,617 B2 * 5/2013 Hannon .......................... 428/57

2008/0044614 A1 * 2/2008 Hannon .......................... 428/57

FOREIGN PATENT DOCUMENTS

| KR | 10-0685665 | B1 | 2/2007 |
| KR | 10-2009-0042321 | A1 | 4/2009 |
| KR | 10-0932191 | B1 | 12/2009 |
| KR | 10-0963564 | B1 | 6/2010 |

* cited by examiner

(a) EXAMPLE 1

(b) EXAMPLE 2

METHOD FOR FINISHING SEAMLESS SPORTSWEAR AND OUTDOOR CLOTHING

CROSS-REFERENCE TO RELATED APPLICATION

This application claims priority to Korean Patent Application No. 10-2011-0116426, filed on Nov. 9, 2011, in the Korean Intellectual Property Office, the entire contents of which are hereby incorporated by reference.

BACKGROUND OF THE INVENTION

1. Field of the Invention

Exemplary embodiments of the present invention relate to a finishing treatment method of seamless sportswear and outdoor clothing.

2. Description of the Related Arts

In general, sportswear and outdoor clothing are completed by cutting a fabric according to each part such as the front, rear, side and sleeves, and fitting the cut fabric pieces to each other. However, in fitting the fabric pieces for each part to each other, a method of sewing the fabric pieces using thread was adopted.

However, in the conventional method of sewing the fabric pieces using the thread, a thickness of sportswear or outdoor clothing is thickened due to the thread sewn in several folds, and in case of the outdoor clothing, upon the use of a knapsack, a pressure may be provided from a thick sewing part.

Furthermore, in order to improve waterproof performance of the sewing part, a seam sealing tape is attached to the existing sportswear and outdoor clothing. At this time, there is a limit that the waterproof performance of the sportswear and the outdoor clothing should depend on only the seam sealing tape.

SUMMARY OF THE INVENTION

An aspect of embodiments of the present invention provides a finishing treatment method of seamless sportswear and outdoor clothing, including: a) welding two or more moisture-permeable waterproof fabrics with an ultrasonic welder in a state of overlapping end parts thereof each other; and b) finishing the end parts of the moisture-permeable waterproof fabrics with a seal sealing tape.

However, a technical problem to be achieved by the embodiments of the present invention is not limited to the aforesaid problem. Other problems, which are not mentioned, could be clearly understood by those having ordinary skill in the art based on the following disclosures.

According to an aspect of the embodiments of the present invention, there is provided a finishing treatment method of seamless sportswear and outdoor clothing, including: a) welding two or more moisture-permeable waterproof fabrics with an ultrasonic welder in a state of overlapping end parts thereof each other; and b) finishing the end parts of the moisture-permeable waterproof fabrics with a seal sealing tape.

In accordance with one embodiment of the present invention, a finishing treatment method of seamless sportswear and outdoor clothing may include: a) welding an inner gusset of a zipper part and a folded part of a moisture-permeable waterproof fabric with an ultrasonic welder in a state of overlapping them each other; b) attaching and fusing a folded side of the moisture-permeable waterproof fabric resulting from the folded part of the moisture-permeable waterproof fabric with a polymer adhesive film; and c) finishing an outer gusset of the zipper part with a seam sealing tape.

In accordance with another embodiment of the present invention, a finishing treatment method of seamless sportswear and outdoor clothing may include: a) attaching and fusing a folded side of a moisture-permeable waterproof fabric resulting from a folded part of the moisture-permeable waterproof fabric with a polymer adhesive film; b) primarily welding an end part of the moisture-permeable waterproof fabric and another moisture-permeable waterproof fabric corresponding to the end part of the moisture-permeable waterproof fabric with an ultrasonic welder in a state of overlapping them each other; c) cutting a moisture-permeable waterproof fabric for finishing treatment having the same shape as the end part of the moisture-permeable waterproof fabric, and secondarily welding the end part of the moisture-permeable waterproof fabric and the moisture-permeable waterproof fabric for finishing treatment with the ultrasonic welder in a state of overlapping them each other; and d) finishing the moisture-permeable waterproof fabric for finishing treatment with a seam sealing tape.

According to the embodiments of the present invention, the finishing treatment method of seamless sportswear and outdoor clothing includes welding two or more moisture-permeable waterproof fabrics with the ultrasonic welder and finishing them with the seam sealing tape, whereby in the seamless sportswear and outdoor clothing which are finishing-treated according to the embodiments of the present invention, since a sewing part such as over lock and so on is removed, a friction or compression phenomenon can be prevented from being generated from a part to which a pressure is applied, a sewing wrinkle generation phenomenon generated upon sewing and a coating face slip phenomenon of the moisture-permeable waterproof fabric due to a sewing needle can be solved, and excellent tensile strength and waterproof performance can be realized.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE INVENTION

The present inventors have completed the present invention by welding sewing parts of sportswear and outdoor clothing with an ultrasonic welder and finishing them with a seam sealing tape rather than removing the sewing parts of the sportswear and outdoor clothing, so that a physical property can be improved.

Hereinafter, the embodiments of the present invention will be explained in detail.

One embodiment of the present invention provides a finishing treatment method of seamless sportswear and outdoor clothing, including: a) welding two or more moisture-permeable waterproof fabrics with an ultrasonic welder in a state of overlapping end parts thereof each other; and b) finishing the end parts of the moisture-permeable waterproof fabrics with a seal sealing tape.

Another embodiment of the present invention provides a finishing treatment method of seamless sportswear and outdoor clothing including: a) welding an inner gusset of a zipper part and a folded part of a moisture-permeable waterproof fabric with an ultrasonic welder in a state of overlapping them each other; b) attaching and fusing a folded side of the moisture-permeable waterproof fabric resulting from the folded part of the moisture-permeable waterproof fabric with a polymer adhesive film; and c) finishing an outer gusset of the zipper part with a seam sealing tape.

Also, still another embodiment of the present invention provides a finishing treatment method of seamless sportswear and outdoor clothing including: a) attaching and fusing a folded side of a moisture-permeable waterproof fabric resulting from a folded part of the moisture-permeable waterproof fabric with a polymer adhesive film; b) primarily welding an end part of the moisture-permeable waterproof fabric and another moisture-permeable waterproof fabric corresponding to the end part of the moisture-permeable waterproof fabric with an ultrasonic welder in a state of overlapping them each other; c) cutting a moisture-permeable waterproof fabric for finishing treatment having the same shape as the end part of the moisture-permeable waterproof fabric, and secondarily welding the end parts of the moisture-permeable waterproof fabric and the moisture-permeable waterproof fabric for finishing treatment with the ultrasonic welder in a state of overlapping them each other; and d) finishing the moisture-permeable waterproof fabric for finishing treatment with a seam sealing tape.

The moisture-permeable waterproof fabric may be composed of a polyester or nylon resin, one or more sides of which are coated with a moisture-permeable waterproof film composed of one or more resins selected from among a fluorinate resin, an urethane resin, a polyethylene terephthalate (PET) resin, an acrylic resin and a silicon resin without being limited thereto.

The moisture-permeable waterproof fabric used in the embodiments of the present invention refers to a fabric which passes through air, but does not pass through water. Reviewing a manufacturing technology thereof, the technology is largely divided into three processes such as a laminating process, a dry process and a wet process.

The welding is performed using the ultrasonic welder and is also conducted for fitting two or more moisture-permeable waterproof fabrics to each other, fitting a zipper part and the moisture-permeable waterproof fabric to each other, or finishing the end part of the moisture-permeable waterproof fabric instead of removing sewing parts. The welding may be performed by ultrasonic welding under the conditions of a frequency of 10 to 50 KHz, and a pressure of 30 to 80 kg/cm$^2$ without being limited thereto. At this time, with regard to the condition of the ultrasonic welding, when the frequency is less than 10 KHz, the welding is not properly conducted, and thus it is problematic that it takes a long working time to conduct the welding. When the frequency is more than 50 KHz, it is problematic that the welding of the moisture-permeable waterproof fabric is excessively performed, or the moisture-permeable waterproof fabric itself gets damaged. Also, when the pressure is less than 30 kg/cm$^2$, it is problematic that a slip phenomenon of the moisture-permeable waterproof fabric occurs or a welding effect is reduced. When the pressure is more than 80 kg/cm$^2$, it is problematic that a physical property of the moisture-permeable waterproof fabric is reduced because the moisture-permeable waterproof fabric of a welding part is compressed.

The seam sealing tape may be composed of an acryl resin, a single-side of which is coated with a polyurethane adhesive without being limited thereto.

A surface of the acryl resin of the seam sealing tape which is not coated with the polyurethane adhesive serves as a fixing layer composed of fiber. Since the polyurethane adhesive of the seam sealing tape is coated on a cross-section of the acrylic resin, a thickness of the entire seam sealing tape is formed thinner than that of a general polymer adhesive film. Thus, an adhesive property of the polyurethane adhesive of the seam sealing tape with a water-repellent finishing treated polyester or nylon resin surface of the moisture-permeable waterproof fabric, which is not coated with the moisture-permeable waterproof film, is reduced. Accordingly, the polyurethane adhesive of the seam sealing tape is bonded to a polyester or nylon resin surface of the moisture-permeable waterproof fabric which is coated with the moisture-permeable waterproof film, thereby enabling finishing treatment to be conducted.

As the finishing using the seam sealing tape is additionally performed after the welding using the ultrasonic welder, tensile strength and waterproof performance can be improved. The finishing using the seam sealing tape may be conducted using a seam sealing machine under the conditions of a temperature of 100~200° C., and a pressure of 10~100 psi without being limited thereto. At this time, With regard to the conditions for the finishing using the seam sealing tape, when the temperature is less than 100° C., it is problematic that adhesive strength is reduced because the polyurethane adhesive is not sufficiently welded, and when the temperature is more than 200° C., it is problematic that the polyurethane adhesive flows out into the outside of the seam sealing tape because the polyurethane adhesive melts, or the moisture-permeable waterproof fabric and the seam sealing tape are thermally damaged. Also, when the pressure is less than 10 psi, a pushing or slip phenomenon is generated between the moisture-permeable waterproof fabric and the seam sealing tape, and when the pressure is more than 100 psi, it is problematic that the moisture-permeable waterproof fabric is damaged due to the strong pressure or the polyurethane adhesive flows out into the outside of the seam sealing tape because the polyurethane adhesive melts at a high temperature.

The polymer adhesive film may be made of an acrylic resin, both-side of which are coated with a polyurethane adhesive without being limited thereto.

The polyurethane adhesive of the polymer adhesive film may be bonded to a polyester or nylon resin surface of the moisture-permeable waterproof fabric coated with the moisture-permeable waterproof film or a polyester or nylon resin surface of the moisture-permeable waterproof fabric not coated with the moisture-permeable waterproof film.

The polymer adhesive film may have a width of 0.5 to 1.5 cm without being limited thereto. In particular, the width of the polymer adhesive film may be formed identical to or narrower than that of a folded side of the moisture-permeable waterproof fabric.

The welding may be conducted using a thermal press machine under the conditions of a temperature of 100~200° C. and a pressure of 10 to 200 kg/cm² without being limited thereto. At this time, with regard to the conditions for the welding, when the temperature is less than 100° C., it is problematic that adhesive strength is reduced because the polyurethane adhesive is not sufficiently welded, and when the temperature is more than 200° C., it is problematic that the polymer adhesive film flows out into the outside of the polymer adhesive film or the moisture-permeable waterproof fabric because the polyurethane adhesive melts, or the polymer adhesive film are thermally damaged. Also, when the pressure is less than 10 kg/cm², it is problematic that adhesive strength is reduced because the pressure is not uniformly transmitted to both sides of an adhesive part, and when the pressure is more than 200 kg/cm², it is problematic that the moisture-permeable waterproof fabric is damaged due to the strong pressure, or the polymer adhesive film flows out into the outside because the polyurethane adhesive melts at a high temperature In order to help with understanding of the present invention, exemplary embodiments according to the present invention will now be described more fully hereinafter with reference to the accompanying drawings. The exemplary embodiments of the present invention may, however, be embodied in many different forms and should not be construed as limited to the embodiments set forth herein. Rather these example embodiments are provided so that this disclosure will be thorough and complete, and will fully convey the scope of the invention to those skilled in the art. It will be further understood that terms used herein should be interpreted as having a meaning that is consistent with their meaning in the context of this specification.

EXAMPLE

Example 1

A moisture-permeable waterproof fabric for a general-purpose, which is made of a polyester resin, a single-side of which being coated with a moisture-permeable waterproof film made of a fluorinate resin, was bought, and a general seam sealing tape (Sealon®), which is made of an acrylic resin, a single-side of which being coated with a polyurethane adhesive, was bought and cut in a width of 2 to 2.5 cm.

In order to fit two moisture-permeable waterproof fabrics to each other, the two moisture-permeable waterproof fabrics were welded with an ultrasonic welder in a state of overlapping end portions thereof each other. At this time, the welding was conducted by ultrasonic welding under the conditions of a frequency of 20 KHz, a pressure of 50~60 kg/cm², a speed of 3.6 m/min, and a roller width of 1 mm.

After this, among the end parts of the moisture-permeable waterproof fabrics, the end portion of a polyester resin surface coated with the moisture-permeable waterproof film was finished with the seam sealing tape, thereby finishing seamless sportswear and outdoor clothing. At this time, the finishing using the seam sealing tape was performed using a seam sealing machine under the conditions of a temperature of 150° C. a pressure of 50 psi, and a speed of 4.26 m/min.

Figure 1:
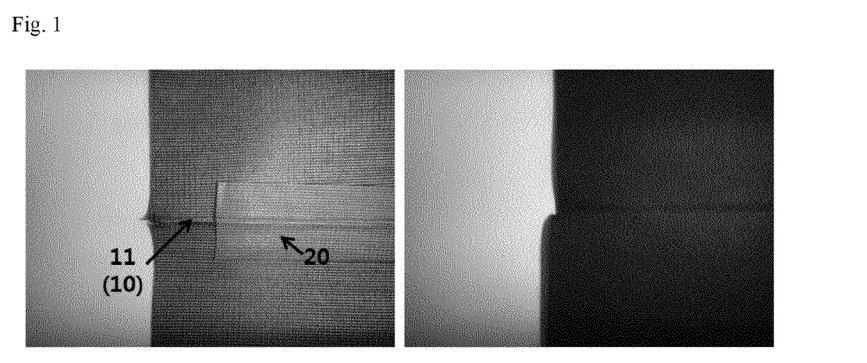
FIG. 1 is photos of seamless sportswear and outdoor clothing which are finishing-treated according to a first exemplary embodiment of the present invention.

FIG. 1 is photos of seamless sportswear and outdoor clothing which are finishing-treated according to a first exemplary embodiment of the present invention.

As shown in FIG. 1, the seamless sportswear and outdoor clothing according to the present exemplary embodiment of the invention are formed by welding two or more moisture-permeable waterproof fabrics 10 with an ultrasonic welder in a state of overlapping end parts thereof 11 each other, and finishing the end parts 11 of the moisture-permeable waterproof fabrics 10 with a seam sealing tape 20.

Example 2

A moisture-permeable waterproof fabric for a general-purpose, which is made of a polyester resin, a single-side of which being coated with a moisture-permeable and waterproof film made of a fluorinate resin, was bought, and a polymer adhesive film (Sealon®), which is made of an acrylic resin, a both-side of which being coated with a polyurethane adhesive, was bought and cut in a width of 0.5 to 1.5 cm. And a general seam sealing tape (Sealon®), which is made of an acrylic resin, a single-side of which being coated with a polyurethane adhesive, was bought and cut in a width of 2 to 2.5 cm.

In order to fit a zipper part and the moisture-permeable waterproof fabric to each other, an inner gusset of the zipper part and a folded part of the moisture-permeable waterproof fabric were welded with an ultrasonic welder in a state of overlapping them each other. At this time, the welding was conducted by ultrasonic welding under the conditions of a frequency of 20 KHz, a pressure of 50~60 kg/cm², a speed of 3.6 m/min, and a roller width of 1 mm.

After this, the polymer adhesive film was bonded to a folded side of the moisture-permeable waterproof fabric resulting from the folded part of the moisture-permeable waterproof fabric, and they were welded using a thermal press machine. At this time, the welding was conducted using the thermal press machine under the conditions of a temperature of 160° C., a pressure of 50~100 kg/cm², and a time of 8~10 seconds.

After this, an outer gusset of the zipper part was finished with a seam sealing tape, thereby finishing seamless sportswear and outdoor clothing. At his time, the finishing using the seam sealing tape was performed using a seam sealing machine under the conditions of a temperature of 150° C., a pressure of 50 psi, and a speed of 4.26 m/min.

Figure 2:
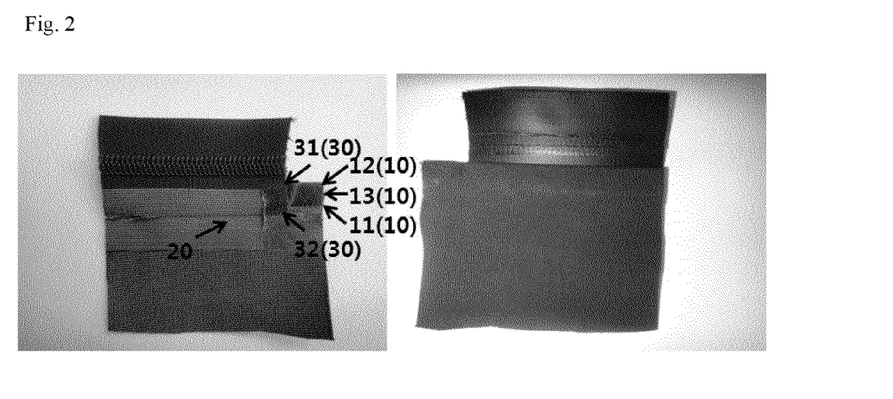
FIG. 2 is photos of seamless sportswear and outdoor clothing which are finishing-treated according to a second exemplary embodiment of the present invention.

FIG. 2 is photos of seamless sportswear and outdoor clothing which are finishing-treated according to a second exemplary embodiment of the present invention.

As shown in FIG. 2, the seamless sportswear and outdoor clothing according to the present exemplary embodiment of the invention is formed by welding an inner gusset 31 of the zipper part 30 and the folded part 12 of the moisture-permeable waterproof fabric 10 with an ultrasonic welder in a state of overlapping them each other, and attaching and fusing a folded side 13 of the moisture-permeable waterproof fabric 10 resulting from the folded part 12 of the moisture-permeable waterproof fabric 10 with a polymer adhesive film (not drawn in the drawings), and thereafter finishing an outer gusset 32 of the zipper part with the seam sealing tape 20.

Example 3

A moisture-permeable waterproof fabric, and a moisture-permeable waterproof fabric for a general-purpose to be used as a moisture-permeable waterproof fabric for finishing treatment, which are made of a polyester resin, a single-side of which being coated with a moisture-permeable waterproof film made of a fluorinate resin, were bought, and a polymer adhesive film (Sealon®), which is made of an acrylic resin, a both-side of which being coated with a polyurethane adhesive, was bought and cut in a width of 0.5 to 1.5 cm. And a general seam sealing tape (Sealon®), which is made of an acrylic resin, a single-side of which being coated with a polyurethane adhesive, was bought and cut in a width of 2 to 2.5 cm.

In order to finish an end part of the moisture-permeable waterproof fabric, a polymer adhesive film was attached to a folded side of the moisture-permeable waterproof fabric for the general-purpose resulting from a folded part of the moisture-permeable waterproof fabric, and they were welded using a thermal press machine. At this time, the welding was conducted using the thermal press machine under the conditions of a temperature of 160° C., a pressure of 50~100 kg/cm², and a time of 8~10 seconds.

After this, the end part of the moisture-permeable waterproof fabric for the general-purpose and another moisture-permeable waterproof fabric for a general-purpose corresponding to the end part of the moisture-permeable waterproof fabric for general-purpose were primarily welded with an ultrasonic welder in a state of overlapping them each other. A moisture-permeable waterproof fabric for finishing treatment having the same shape as the end part of the moisture-permeable waterproof fabric was cut, and the end part of the moisture-permeable waterproof fabric and the moisture-permeable waterproof fabric for finishing treatment were secondarily welded with the ultrasonic welder in a state of overlapping them each other. At this time, the primarily welding and the secondarily welding were conducted by ultrasonic welding under the conditions of a frequency of 20 KHz, a pressure of 50~60 kg/cm², a speed of 3.6 m/min, and a roller width of 1 mm.

After this, a polyester resin surface of the moisture-permeable waterproof fabric for finishing treatment coated with a moisture-permeable waterproof film was finishing-treated with a seam sealing tape, thereby finishing the seamless sportswear and outdoor clothing. At this time the finishing using the seam sealing tape was conducted using a seam sealing machine under the conditions of a temperature of 150° C., a pressure of 50 psi, and a speed of 4.26 m/min.

As such, by using the moisture-permeable waterproof fabric for finishing treatment, the polyurethane adhesive of the seam sealing tape is bonded to the polyester resin surface of the moisture-permeable waterproof fabric for finishing treatment coated with a moisture-permeable waterproof film rather than a polyester resin surface of the moisture-permeable waterproof fabric not coated with a moisture-permeable waterproof film, thereby enabling finishing treatment to be performed.

Figure 3:
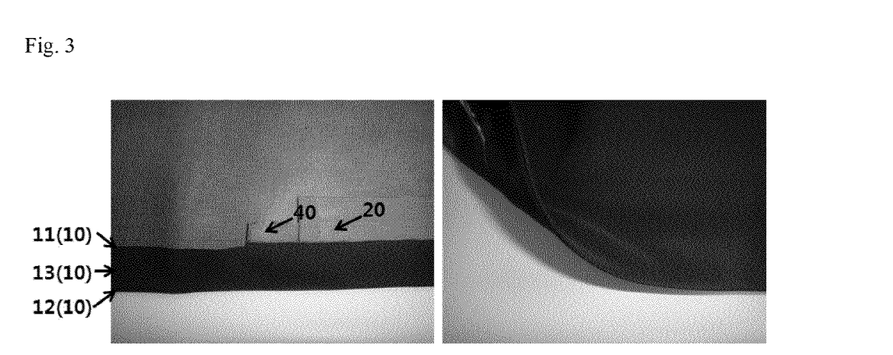
FIG. 3 is photos of seamless sportswear and outdoor clothing which are finishing-treated according to a third exemplary embodiment of the present invention.

FIG. 3 is photos of seamless sportswear and outdoor clothing which are finishing-treated according to a third exemplary embodiment of the present invention.

As shown in FIG. 3, the seamless sportswear and outdoor clothing according to the present exemplary embodiment of the invention is formed by attaching and fusing the folded side 13 of the moisture-permeable waterproof fabric 10 resulting from the folded part 12 of the moisture-permeable waterproof fabric 10 with a polymer adhesive film (not drawn in the drawings), primarily welding the end part 11 of the moisture-permeable waterproof fabric 10 and another moisture-permeable waterproof fabric corresponding to the end part 11 of the moisture-permeable waterproof fabric 10 with an ultrasonic welder in a state of overlapping them each other, cutting a moisture-permeable waterproof fabric for finishing treatment 40 having the same shape as the end part 11 of the moisture-permeable waterproof fabric 10, and secondarily welding the end part of the moisture-permeable waterproof fabric 10 and the moisture-permeable waterproof fabric for finishing treatment 40 with an ultrasonic welder in a state of overlapping them each other, and finishing the moisture-permeable waterproof fabric for finishing treatment 40 with the seam sealing tape 20.

Comparative Example 1

Sportswear and outdoor clothing were finishing-treated by using the same moisture-permeable waterproof fabric as that of Example 1 except for sewing the fabric using thread instead of welding it with an ultrasonic welder and finishing it with a seam sealing tape.

Comparative Example 2

Sportswear and outdoor clothing were finishing-treated by using the same moisture-permeable waterproof fabric as that of Example 1 except for sewing the fabric using thread instead of welding it with an ultrasonic welder and finishing it with a seam sealing tape under the same conditions.

Experimental Example 1

In order to compare tensile strengths of the sportswear and the outdoor clothing which were finishing-treated in Examples 1 and 2, and Comparative Examples 1 and 2 described above, the tensile strength was measured by "a tensile strength and ductility test method of a fabric to a strip method" using a standard of KS K 0521:2006.

Figure 4:
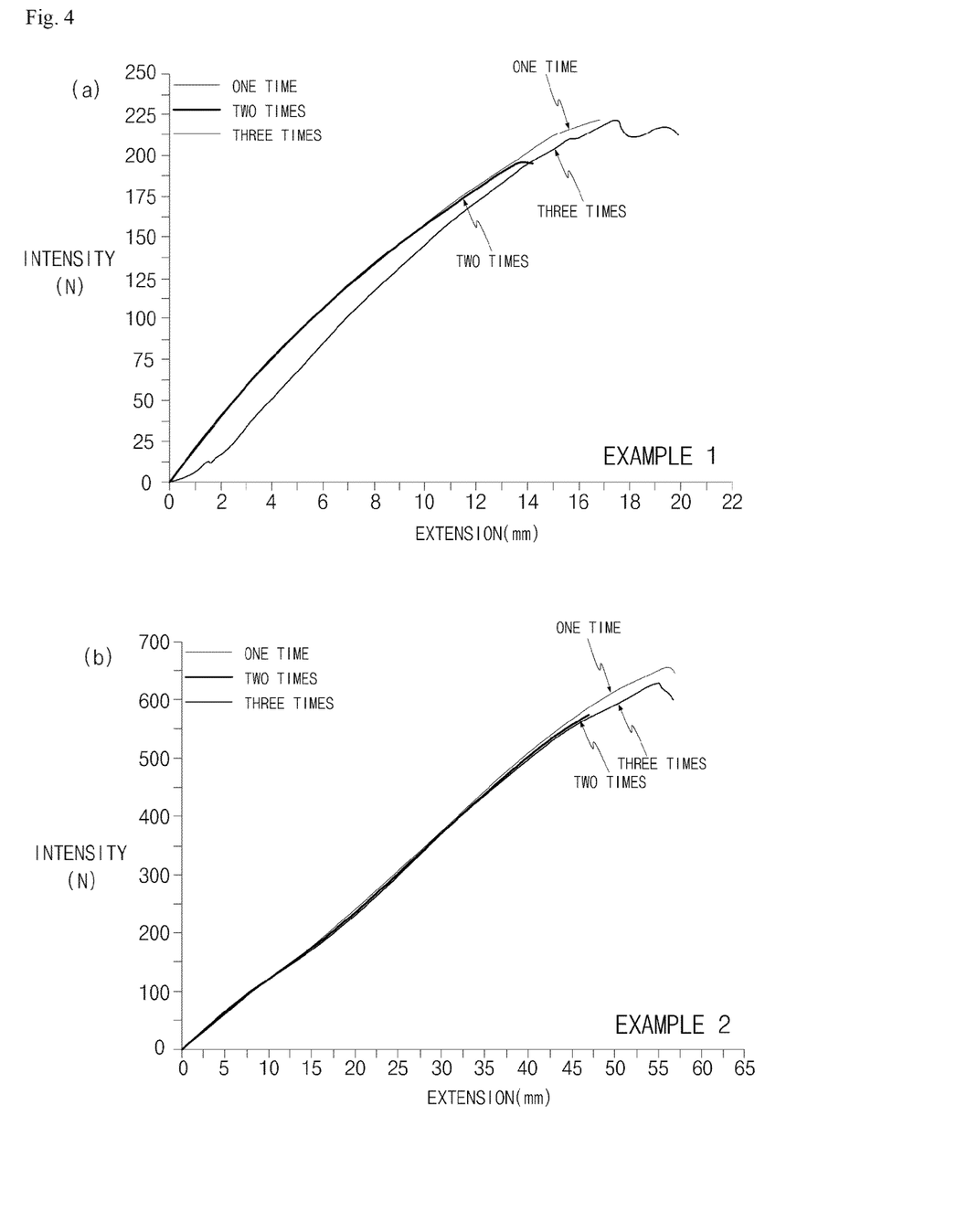
FIG. 4 is a graph showing the excellence of tensile strength of seamless sportswear and outdoor clothing which are finishing-treated according to one exemplary embodiment of the present invention.

FIG. 4 is a graph showing the excellence of tensile strength of seamless sportswear and outdoor clothing which are finishing-treated according to one exemplary embodiment of the present invention.

As shown in FIG. 4, the seamless sportswear and outdoor clothing which were finishing-treated in Example 1 (FIG. 4(a)) showed an average tensile strength of 212 N, and also showed two or more time excellent tensile strength compared to that of the seamless sportswear and outdoor clothing which were finishing-treated in Comparative Example 1 (FIG. 4(c)). Furthermore, it could be confirmed that the seamless sportswear and outdoor clothing which were finishing-treated in Example 1 can maintain the tensile strength of an equal level to that of the seamless sportswear and outdoor clothing which were finishing-treated in Comparative Example 2 (FIG. 4(d). In particular, the seamless sportswear and outdoor clothing which were finishing-treated in Example 2 (FIG. 4(b)) showed an average tensile strength of 613 N, and thus it could be confirmed that the tensile strength was largely improved.

Experimental Example 2

In order to compare waterproof performances of the sportswear and outdoor clothing which were finishing-treated in Example 1 and Comparative Example 2 described above, a hydrostatic pressure was measured by "a textile fabric-hydrostatic pressure measurement-hydraulic method" using a standard of KS KISO 811:2009.

Figure 5:
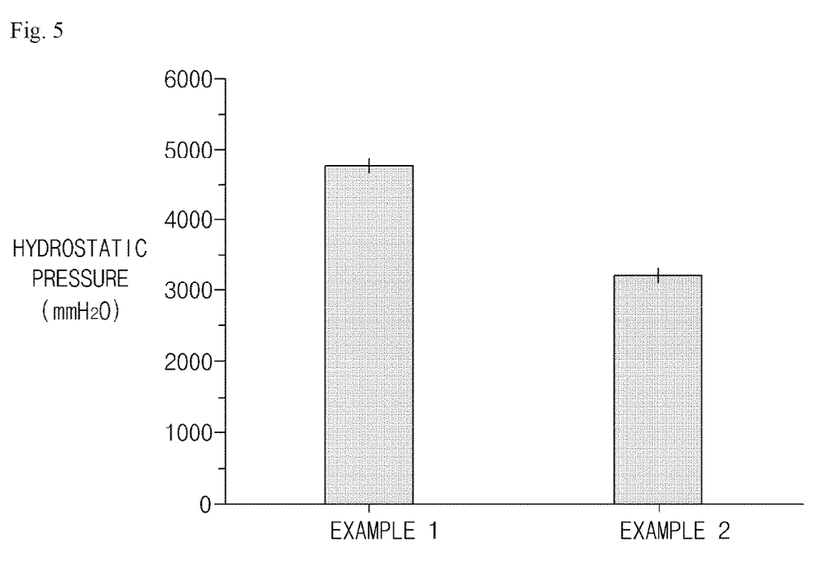
FIG. 5 is a graph showing the excellence of waterproof performance of seamless sportswear and outdoor clothing which are finishing-treated according to one exemplary embodiment of the present invention.

FIG. 5 is a graph showing the excellence of waterproof performance of seamless sportswear and outdoor clothing which are finishing-treated according to one exemplary embodiment of the present invention.

As shown in FIG. 5, the seamless sportswear and outdoor clothing which were finishing-treated in Example 1 showed an average water resistance of 4776 mmH$_2$O, the seamless sportswear and outdoor clothing which were finishing-treated in Comparative Example 1 showed an average water resistance of 3216 mmH$_2$O, and it could be confirmed that the seamless sportswear and outdoor clothing which were finishing-treated in Example 1 has a largely improved water resistance compared to the seamless sportswear and outdoor clothing which were finishing-treated in Comparative Example 2.

Accordingly, the finishing treatment method of the seamless sportswear and outdoor clothing includes welding the end parts of two or more moisture-permeable waterproof fabrics with the ultrasonic welder and finishing them with the seam sealing tape, whereby in the seamless sportswear and outdoor clothing which are finishing treated according to the embodiments of the present invention, since a sewing part such as over lock and the like is removed, a friction or compression phenomenon can be prevented from being generated from a part to which a pressure is applied, a sewing wrinkle generation phenomenon generated upon sewing and a coating face slip phenomenon of the moisture-permeable waterproof fabric due to a sewing needle can be solved, and excellent tensile strength and waterproof performance can be realized.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A finishing treatment method of seamless sportswear and outdoor clothing, comprising:
    a) welding two or more moisture-permeable waterproof fabrics with an ultrasonic welder in a state of overlapping end parts thereof each other; and
    b) finishing the end parts of the moisture-permeable waterproof fabrics with a seal sealing tape,
    wherein the seam sealing tape is made of an acrylic resin, a single-side of which is coated with a polyurethane adhesive,
    and the polyurethane adhesive of the seam sealing tape is coated on a cross-section of the acrylic resin, a thickness of the entire seam sealing tape is formed thinner than that of a general polymer adhesive film.

2. A finishing treatment method of seamless sportswear and outdoor clothing, comprising:
    a) welding an inner gusset of a zipper part and a folded part of a moisture-permeable waterproof fabric with an ultrasonic welder in a state of overlapping them each other;
    b) attaching and fusing a folded side of the moisture-permeable waterproof fabric resulting from the folded part of the moisture-permeable waterproof fabric with a polymer adhesive film; and
    c) finishing an outer gusset of the zipper part with a seam sealing tape,
    wherein the seam sealing tape is made of an acrylic resin, a single-side of which is coated with a polyurethane adhesive,
    and the polyurethane adhesive of the seam sealing tape is coated on a cross-section of the acrylic resin, a thickness of the entire seam sealing tape is formed thinner than that of a general polymer adhesive film.

3. A finishing treatment method of seamless sportswear and outdoor clothing, comprising:
    a) attaching and fusing a folded side of a moisture-permeable waterproof fabric resulting from a folded part of the moisture-permeable waterproof fabric with a polymer adhesive film;
    b) primarily welding an end part of the moisture-permeable waterproof fabric and another moisture-permeable waterproof fabric corresponding to the end part of the moisture-permeable waterproof fabric with an ultrasonic welder in a state of overlapping them each other;
    c) cutting a moisture-permeable waterproof fabric for finishing treatment having the same shape as the end part of the moisture-permeable waterproof fabric, and secondarily welding the end part of the moisture-permeable waterproof fabric and the moisture-permeable waterproof fabric for finishing treatment with the ultrasonic welder in a state of overlapping them each other; and
    d) finishing the moisture-permeable waterproof fabric for finishing treatment with a seam sealing tape,
    wherein the seam sealing tape is made of an acrylic resin, a single-side of which is coated with a polyurethane adhesive,
    and the polyurethane adhesive of the seam sealing tape is coated on a cross-section of the acrylic resin, a thickness of the entire seam sealing tape is formed thinner than that of a general polymer adhesive film.

4. The finishing treatment method of any one of claims 1 to 3, wherein the moisture-permeable waterproof fabric is composed of a polyester or nylon resin, one or more sides of which are coated with a moisture-permeable waterproof film composed of one or more resins selected from among a fluorinate resin, an urethane resin, a polyethylene terephthalate (PET) resin, an acrylic resin and a silicon resin.

5. The finishing treatment method of any one of claims 1 to 3, wherein the welding is performed by ultrasonic welding under the conditions of a frequency of 10 to 50 KHz, and a pressure of 30 to 80 kg/cm$^2$.

6. The finishing treatment method of any one of claims 1 to 3, wherein the seam sealing tape has a width of 2~2.5 cm.

7. The finishing treatment method of any one of claims 1 to 3, wherein the finishing using the seam sealing tape is conducted using a seam sealing machine under the conditions of a temperature of 100~200° C., and a pressure of 10~100 psi.

8. The finishing treatment method of claim 2 or 3, wherein the polymer adhesive film is made of an acrylic resin, both-side of which are coated with a polyurethane adhesive.

9. The finishing treatment method of claim 2 or 3, wherein the polymer adhesive film has a width of 0.5~1.5 cm.

10. The finishing treatment method of claim 2 or 3, wherein the welding is conducted using a thermal press machine under the conditions of a temperature of 100~200° C., and a pressure of 1~200 kg/cm$^2$.

* * * * *